United States Patent [19]

Baskin et al.

[11] Patent Number: 4,557,666
[45] Date of Patent: Dec. 10, 1985

[54] WIND TURBINE ROTOR

[75] Inventors: Joseph M. Baskin, Mercer Island; Gary E. Miller, Tukwila; Wayne Wiesner, Kent, all of Wash.

[73] Assignee: The Boeing Company, Seattle, Wash.

[21] Appl. No.: 537,749

[22] Filed: Sep. 29, 1983

[51] Int. Cl.⁴ .............................................. F03D 7/04
[52] U.S. Cl. ........................................ 416/32; 416/11; 416/226; 416/242
[58] Field of Search ................. 416/32 B, 11, 32, 242, 416/226, DIG. 2, 7

[56] References Cited

U.S. PATENT DOCUMENTS

| | | | |
|---|---|---|---|
| 1,746,991 | 2/1930 | Bucklen . | |
| 2,058,500 | 10/1936 | Plucker | 290/55 |
| 2,086,279 | 7/1937 | McDonald, Jr. | 290/44 |
| 2,106,557 | 1/1938 | Putnam | 290/44 |
| 2,148,804 | 2/1939 | Claytor | 290/44 |
| 2,148,921 | 2/1939 | Allen | 416/23 |
| 2,178,047 | 10/1939 | Malme | 290/44 |
| 2,178,679 | 11/1939 | Claytor | 290/44 |
| 2,207,200 | 7/1940 | Hoffmann | 170/159 |
| 2,236,494 | 3/1941 | Albers | 416/223 R |
| 2,339,749 | 1/1944 | Albers | 290/44 |
| 2,484,197 | 10/1949 | Veldhuis | 290/44 |
| 2,485,543 | 10/1949 | Andreau | 416/142 B X |
| 2,622,686 | 12/1952 | Chevreau et al. | 416/23 |
| 3,597,108 | 8/1971 | Mercer et al. | 416/139 |
| 4,025,230 | 5/1977 | Kastan | 416/18 |
| 4,039,848 | 8/1977 | Winderl | 290/55 |
| 4,059,771 | 11/1977 | Jacobs et al. | 290/44 |
| 4,095,120 | 6/1978 | Moran et al. | 290/44 |
| 4,146,264 | 3/1979 | Korzeniewski | 290/44 |
| 4,171,929 | 10/1979 | Allison | 416/226 |
| 4,228,391 | 10/1980 | Owen | 322/35 |
| 4,297,076 | 10/1981 | Donham et al. | 416/37 |
| 4,355,955 | 10/1982 | Kisovec | 416/23 |
| 4,357,542 | 11/1982 | Kirschbaum | 290/44 |
| 4,389,162 | 6/1983 | Doellinger et al. | 416/225 |
| 4,392,781 | 7/1983 | Mouille et al. | 416/223 R |
| 4,435,646 | 3/1984 | Coleman et al. | 290/44 |

FOREIGN PATENT DOCUMENTS

| | | | |
|---|---|---|---|
| 456963 | 5/1949 | Canada | 416/132 B |
| 908631 | 4/1946 | France | 416/132 B |
| 61508 | 5/1955 | France | 416/41 A |
| 2288877 | 10/1974 | France | 416/132 B |

OTHER PUBLICATIONS

"The Wind Power Book", by Jack Park.
"Windmills Stage a Comeback", by T. S. Jayadev.
"Development of Large Wind Turbine Generators", dated Mar. 1979.

Primary Examiner—Everette A. Powell, Jr.
Attorney, Agent, or Firm—Delbert J. Barnard

[57] ABSTRACT

A fixed pitch wind turbine rotor (18) is teeter mounted (76, 78, 80) onto a low speed input shaft (44) which is connected to the input (58) of a step-up transmission (46). The output (48) of the transmission (46) is connected to a rotary pole amplitude modulated induction machine (42) which is operable as a generator at a plurality of discreet speeds of rotation and is also operable as a startup motor for the rotor. A switch (45) responsive to the rotational speed of the wind turbine rotor switches the generator from one speed of operation to the other. The rotor hub (72) and the inner body portions (71) of two blades (68, 70), which extend radially outwardly in opposite directions from the hub (72), are constructed from steel. The outer end portions (73) of the blade (68, 70) are constructed from a lighter material, such as wood, and are both thinner and narrower than the remainder of the rotor. The outer end section (73) of each blade (68, 70) includes a main body portion and a trailing edge portion (104) which is hinge-connected to the main body portion. Each blade (68, 70) includes a centrifugal force operated positioning means (98, 100) which normally holds the drag brake section (104) in a retracted position, but operates in response to a predetermined magnitude of centrifugal force to move the drag brake (104) section into its deployed position. Each blade has an airfoil cross section and each blade (68, 70) has a plus twist inner portion adjacent the hub (72) changing to first a zero twist and then a minus twist as it extends radially outwardly from the hub (72).

19 Claims, 20 Drawing Figures

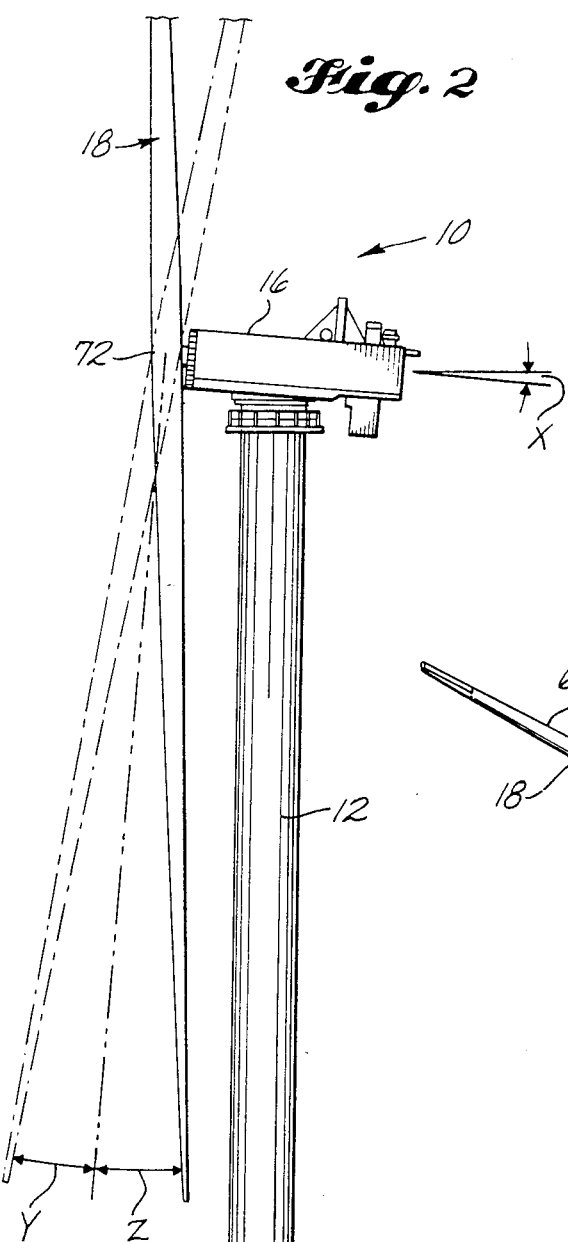
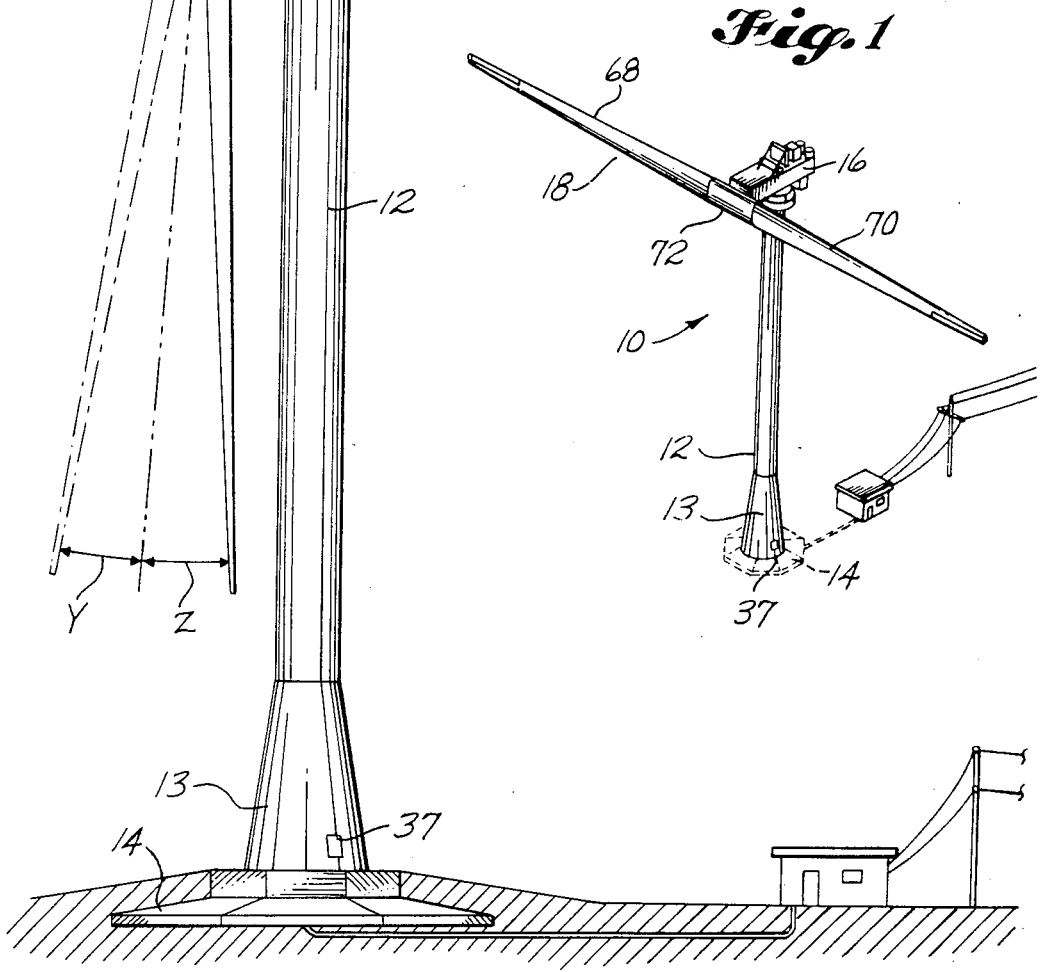

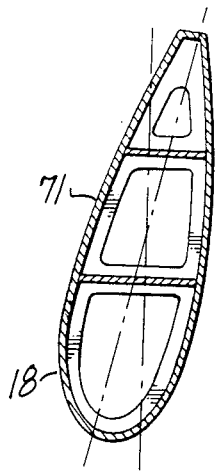
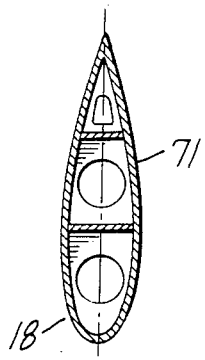
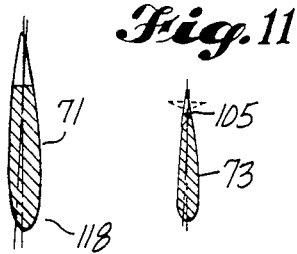
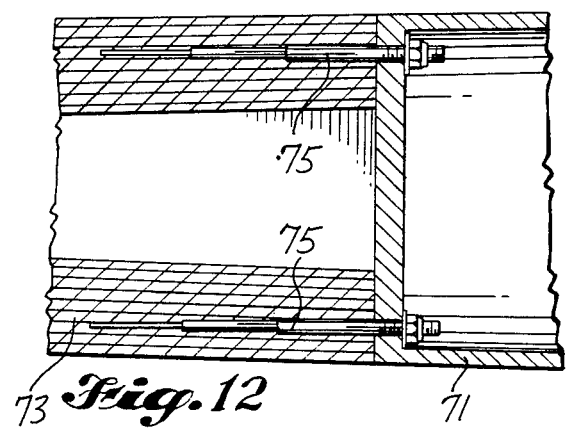
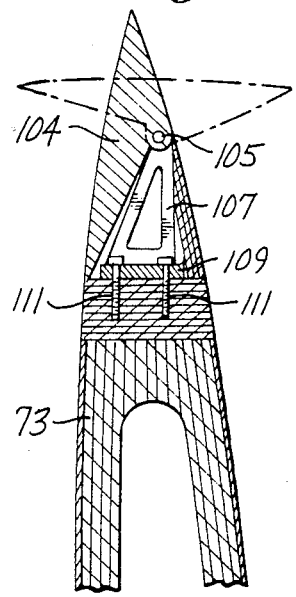
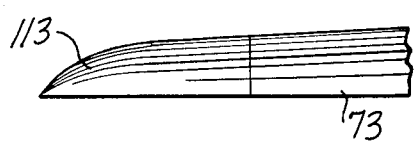

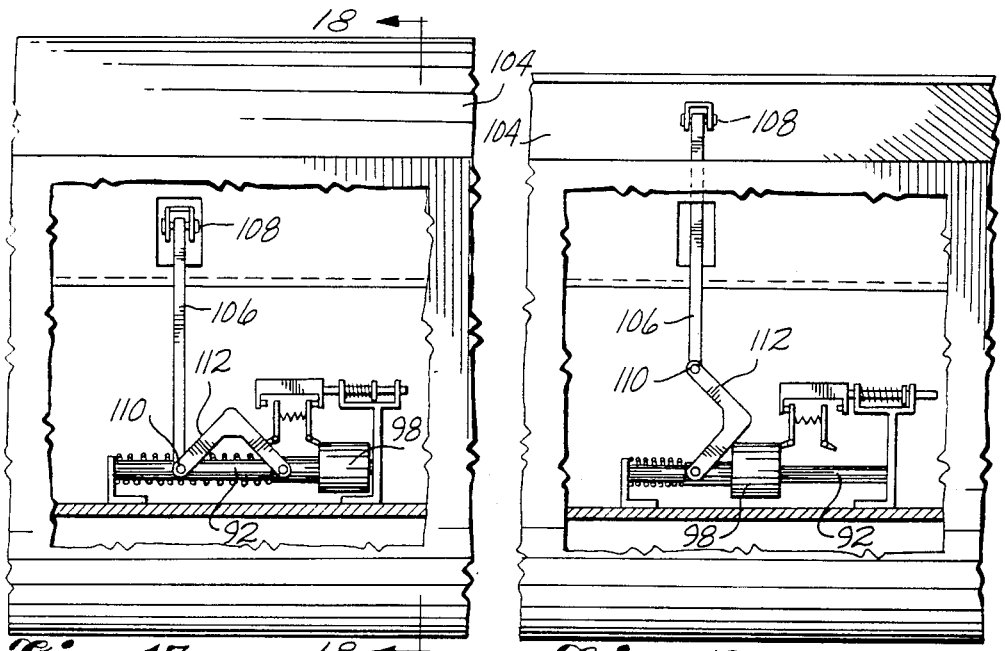
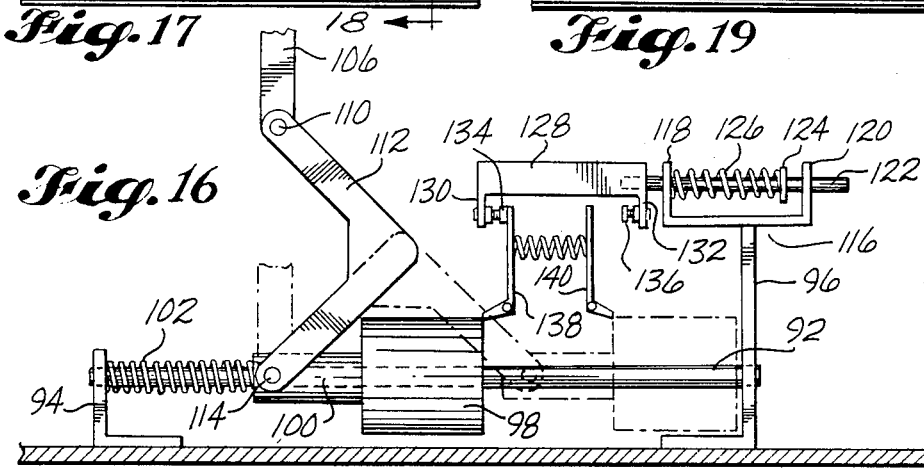
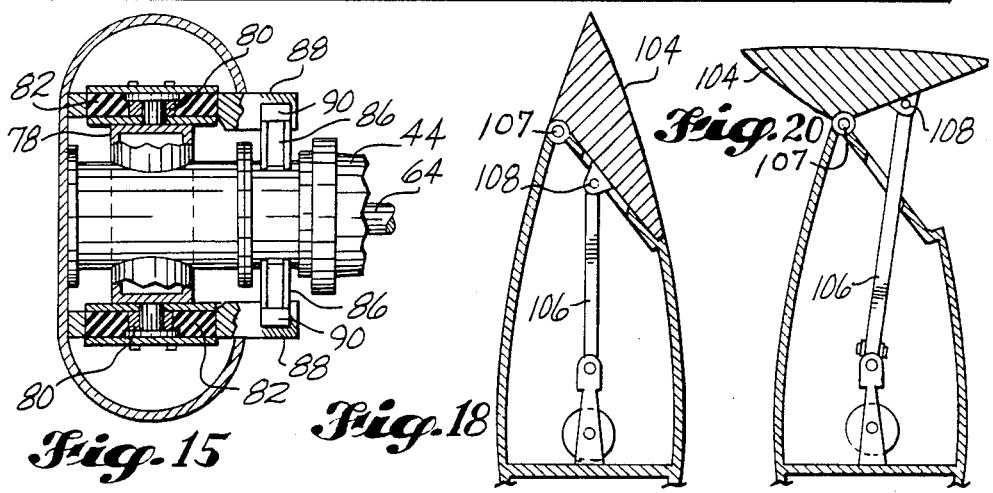

WIND TURBINE ROTOR

DESCRIPTION

1. Technical Field

This invention relates to wind powered systems for generating electricity, and in particular to rotors for large wind turbine systems sized to generate electricity for utilities.

2. Related Application

This application is copending with a companion application Ser. No. 537,750, filed Sept. 29, 1983, and entitled "Wind Powered System For Generating Electricity". The contents of that application are hereby expressly incorporated into this application by specific reference.

3. Background Art

A history of the development of wind energy is presented by the publication entitled, "Wind Energy Developments In The Twentieth Century", published by the Lewis Research Center of the National Aeronautics and Space Administration, Cleveland, Ohio, in 1979. A predecessor to the subject wind turbine system, termed the "Mod-2 Wind Turbine", is described both in that publication and in another publication simply entitled, "Mod-2", published by the Bonneville Power Administration, U.S. Department of Energy.

The "Mod-2" wind turbine system comprises a 300 ft. diameter turbine rotor composed of two variable pitch blades. The first Mod-2 generator was incorporated into the Bonneville Power Administration grid in early 1981. Since that time, two additional Mod-2 generators have been incorporated into the grid.

A fixed pitch wind turbine rotor offers a simplification and lower cost over that of a controllable blade pitch wind turbine rotor. However, a fixed pitch rotor is harder to start because the blade pitch for efficient operation is different from that for good starting. A proposed solution to this problem is to use the generator that is driven by a wind turbine rotor as a motor during startup to bring the wind turbine rotor up to operating speed. This concept is proposed in U.S. Pat. No. 4,228,391, granted Oct. 14, 1980, to Witney H. Owen, in conjunction with the use of an induction machine having two sets of windings.

A fixed pitch turbine rotor is designed to stall in high winds to limit rotor torque. Such winds input considerable power to the rotor before stall and, therefore, the electrical generator and drive system have to be large and strong enough to take the maximum torque that the rotor can generate. Thus, the generator must not only act as a starter but must be capable of absorbing the maximum power output of the rotor. The rotor in turn must have the capability to not critically overspeed in the event the load is for some reason removed from it. One proposed way of limiting the rotational speed of a wind turbine rotor is to provide the rotor with a centrifugal force operated drag brake. This concept is disclosed by U.S. Pat. No. 2,058,500, granted Oct. 27, 1936, to Frederick C. Plucker, in conjunction with a small wind turbine system.

DISCLOSURE OF THE INVENTION

A wind turbine rotor in accordance with the present invention is basically characterized by a quite large diameter (e.g. 300 ft.) and a pair of fixed pitch blades extending radially outwardly in opposite directions from a hub and each having a fixed pitch mid-section of airfoil cross section and a fixed pitch tip section, of airfoil cross section. Each blade has a plus twist portion adjacent the hub and changes to first a zero twist and then a minus twist as it extends radially outwardly from the hub.

Another aspect of the invention is to provide a fixed pitch wind turbine rotor of the type described wherein the outer end sections of the blades are constructed from a lighter material than the remainder of the rotor and are thinner and narrower than the remainder of the rotor.

In preferred form, the rotor hub has a central portion with no twist, with rounded edges and with a substantially constant thickness between the edges. And, each blade smoothly changes into an airfoil cross section as it extends radially outwardly from the central portion of the hub.

Preferably, the airfoil profile of each blade changes as the blade extends radially outwardly, from a substantially NACA 23028 airfoil profile plus twist, to a substantially NACA 23023 airfoil profile, to a substantially NACA 43018 airfoil profile, to a substantially NACA 43012 airfoil profile (minus twist).

In preferred form, the rotor comprises an all steel welded hub and each blade comprises an all steel welded mid-section and a laminated wood outer end section.

In accordance with another aspect of the invention, the outer end section of at least one blade of the turbine rotor comprises a main portion including a leading edge for the section, and a drag brake forming, trailing edge portion which is hinge-connected to said main portion, for movement between a retracted position in which it forms a streamlined trailing edge for said outer end section in a deployed position in which it extends generally across the chord of the outer end section and functions as an aerodynamic drag brake.

In preferred form, the drag brake is held in its retracted position by means of a centrifugal force triggered positioning means. The triggering means is adapted to operate in response to a centrifugal force of a predetermined magnitude to move the drag brake into its deployed position, so that the drag brake will operate to prevent the turbine rotor from overspeeding.

Other more detailed features of the invention are described in the description of the preferred embodiment and are particularly pointed out in the appended claims.

BRIEF DESCRIPTION OF THE DRAWINGS

In the drawings, which show a preferred embodiment of the invention, like element designations refer to like parts throughout the several views, and FIG. 1 is a pictorial view of a wind powered system for generating electricity constructed in accordance with the present invention, taken from above and looking towards the front and one side of a wind turbine installation;

FIG. 2 is an enlarged scale side elevational view of the wind turbine with an upper portion of the wind turbine rotor omitted, such view including a solid line showing of the turbine rotor at one limit of teeter and a broken line showing of the turbine rotor at its opposite limit of teeter;

FIG. 8 is a cross-sectional view taken susbstantially along line 8—8 of FIG. 7;

FIG. 9 is a cross-sectional view taken substantially along line 9—9 of FIG. 7;

FIG. 10 is a cross-sectional taken substantially along line 10—10 of FIG. 7, such view including a solid line showing of the drag brake in its retracted position and a broken line showing of the drage brake in its deployed position;

FIG. 11 is a cross-sectional view taken substantially along line 11—11 of FIG. 7, such view also including a solid line showing of the drag brake in its retracted position and a broken line showing of the drag brake in its deployed position;

FIG. 12 is a fragmentary longitudinal sectional view in the vicinity of where the wooden outer end section of the rotor is attached to the outer end of the intermediate section of the rotor;

FIG. 13 is a longitudinal sectional view taken in the region of the drag brake, including a solid line showing of the drag brake in its retracted position and a broken showing of the drag brake in its deployed position;

FIG. 14 is a pictorial view of a fixed, sculptured tip section of the rotor;

FIG. 15 is a sectional view taken substantially along line 15—15 of FIG. 7, showing some additional detail of the teeter connection between the turbine rotor and the outboard end of the generator drive shaft;

FIG. 16 is a side elevational view of the centrifugal force controlled and operated mechanism for positioning the drag brake, including a solid line showing of the mechanism in a deployed position and a broken line showing of the mechanism in a retracted position;

FIG. 17 is a fragmentary view of the turbine rotor in the vicinity of the drag brake operating mechanism, with the foreground portion of the rotor cut away to disclose the mechanism, said mechanism being shown in its retracted position;

FIG. 18 is a sectional view taken substantially along line 18—18 of FIG. 17;

FIG. 19 is a view like FIG. 17, but showing the operating mechanism and the drag brake in their deployed position; and FIG. 20 is a view like FIG. 18, but showing the drag brake and its operating mechanism in their deployed position.

BEST MODE FOR CARRYING OUT THE INVENTION

Figure 3:
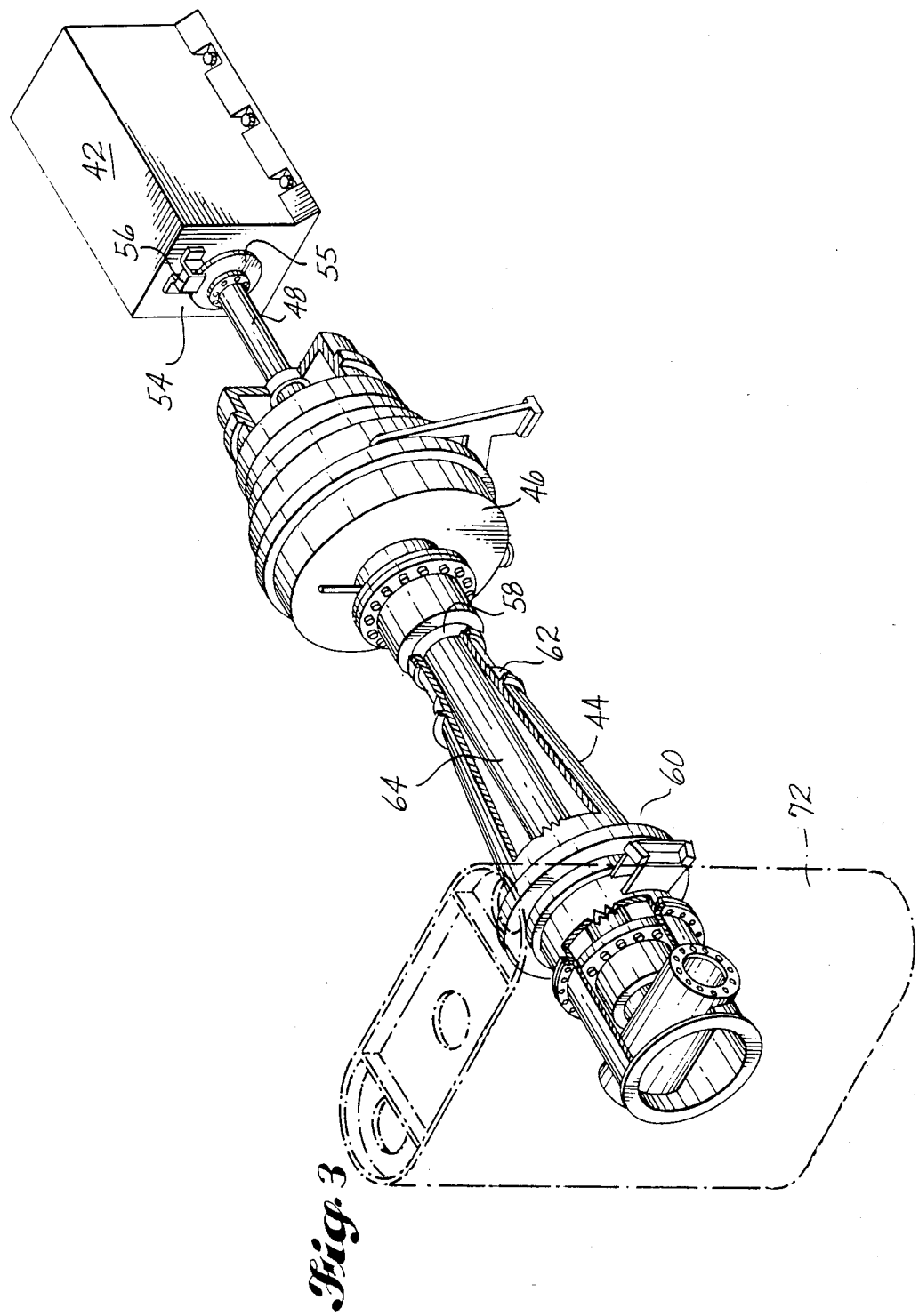
FIG. 3 is a pictorial view of a generator drive assembly, with some parts being omitted, some being shown in partial section, and others being shown by broken lines.

Referring to FIGS. 1 and 3, the wind turbine 10 comprises a tubular tower 12 which may be constructed from steel sections which are welded together. The base 13 of the tower may be bolted or otherwise firmly secured to a reinforced concrete foundation 14. In normal soil conditions, a buried octagonal stepped foundation configuration may be used (FIGS. 1 and 2).

In an example installation, the tower 12 is 191.5 feet tall and 11 feet in diameter, with base section 13 flaring to 21 feet in diameter at the ground.

Figure 5:
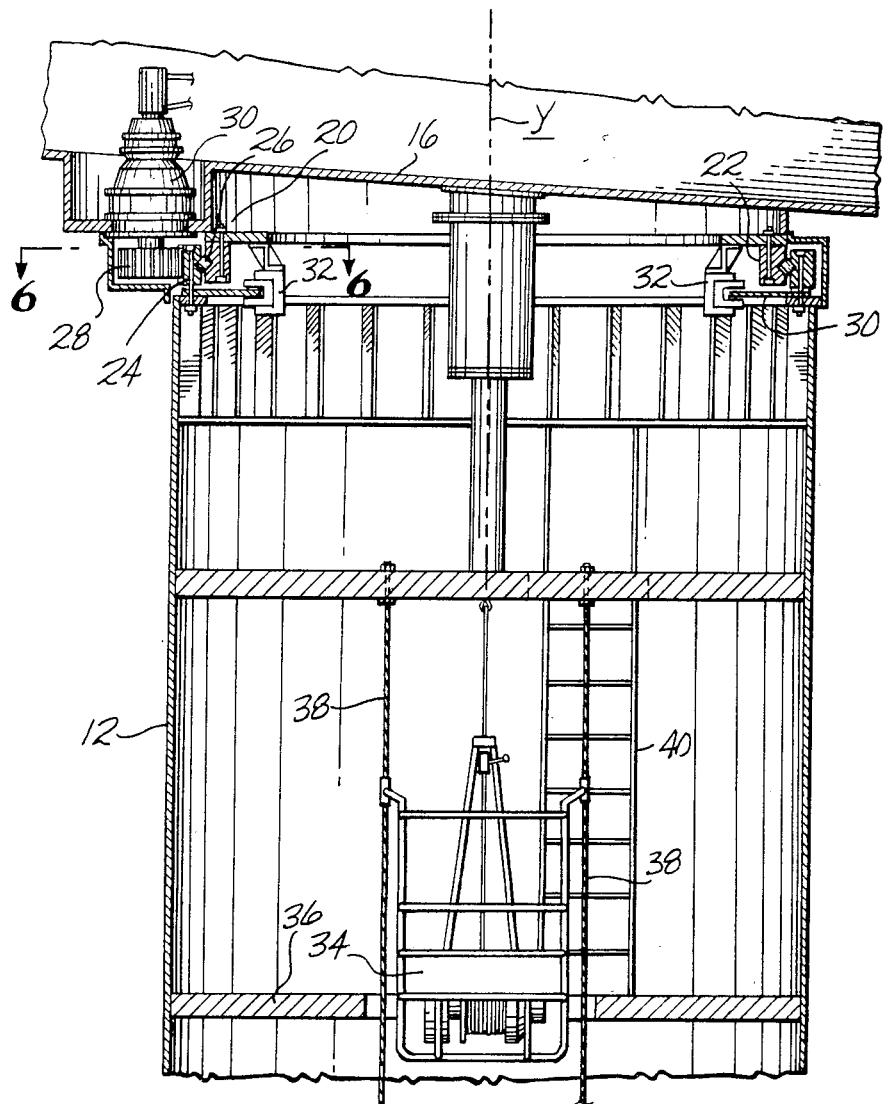
FIG. 5 is an enlarged scale vertical sectional view taken through the upper portion of a support column and a lower portion of a nacelle, in the vicinity of a main bearing supporting the nacelle for rotation on top of the support column, and a drive motor for causing rotation of the nacelle relative to the support column, with some parts being shown in side elevation.

A nacelle structure 16 is mounted on top of the tower 12 for rotation about a vertical axis y (FIG. 5). The nacelle structure 16 carries the support system for the wind turbine rotor 18 which in the example installation measures 304 feet in diameter. The vertical distance between the ground and the axis of rotation of the rotor 18 is 204.5 feet. The vertical clearance between the rotor tips and the ground is 52.5 feet.

Figure 6:
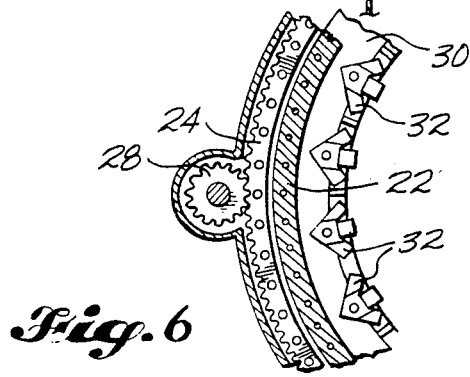
FIG. 6 is a fragmentary sectional view taken substantially along line 6—6 of FIG. 5.

A yaw control system connects the nacelle 16 to the upper end of the tower 12 and includes a yaw bearing 20. Bearing 20 is a combination bearing and comprises an inner race 22 that is bolted to the nacelle, an outer race 24 which is bolted to an upper frame portion of the tower 12, and a ring of antifraction elements 26 (e.g. rollers set at an angle to the bearing axis) between the two races 22, 24. Bearing race 24 is also a fixed ring gear having radially outwardly directed teeth (FIGS. 5 and 6). The teeth of a drive gear 28 which is connected to the output shaft of a drive motor 30 meshes with the teeth of yaw gear 24. Drive motor 30 may be a hydraulic motor and may include a control system which operates to power the drive motor 30 as necessary in order to rotate the nacelle for maintaining the rotor 18 facing into the wind. The yaw system preferably also includes a hydraulic brake which functions to provide damping during yaw motion. As shown by FIGS. 5 and 6, the brake may comprise an annular brake disc 30 which is fixed in position relative to the tower 12 and a plurality of brake calipers 32 which are carried by the nacelle structure 16. Additional brake calipers 32 hold the nacelle from inadvertent yawing due to the wind loads during "no yaw" operation. The brake calipers 32 are spring actuated and hydraulically released. This is a fail-safe feature assuring that the brakes are applied if there is a hydraulic failure.

In the example embodiment, the raceway diameter of bearing 20 is approximately 134 inches in order to handle the large overturning moments and to react the rotor torque.

The tower includes an internal lift 34 which may be a suspended staging. By way of example, lift 34 may be of the type disclosed by U.S. Pat. No. 2,998,094, granted Aug. 29, 1961 to Sidney L. Fisher. The lift 34 ascends and decends between ground level and an elevated platform 36 which is located near the top of the tower 12. Entry into tower 12 at ground level is via a door 37. Guide cables 38 may be provided for guiding and stabilizing the lift 34. A ladder 40 extends upwardly from platform 36 to an access opening in the bottom of the nacelle housing 16.

Referring to FIG. 3, the system includes a drive train assembly consisting of a low speed shaft 44, a gear box 46, a high speed shaft 48, and a rotor brake 54. In FIG. 3, the rotor brake is shown in the form of a disc 55 carried by the rotating shaft 48 and a brake caliper 56.

The low speed shaft 44 connects the rotor 18 to the gear box input 58. Shaft 44 is supported from the nacelle structure by two self-aligning bearings (not shown) which engage it at locations 60, 62. Low speed shaft 44 may include an internal quill shaft 64 which is connected to the input shaft 58 of the transmission 46 by means of a flexible coupling (not shown). The use of a flexible coupling compensates for misalignment between the quill shaft 64 and the gear box input shaft 58.

The gear box 46 is a three-stage planetary gear box. In the illustrated example, the step up ratio of gear box 46 is 95:1. The output shaft of the gear box 46 is attached to the input shaft of machine 42 by means of a high speed steel shaft 48. The brake caliper 56 is disengaged by the application of hydraulic pressure. The brake is engaged by spring force when the hydraulic pressure is relieved.

Figure 4:
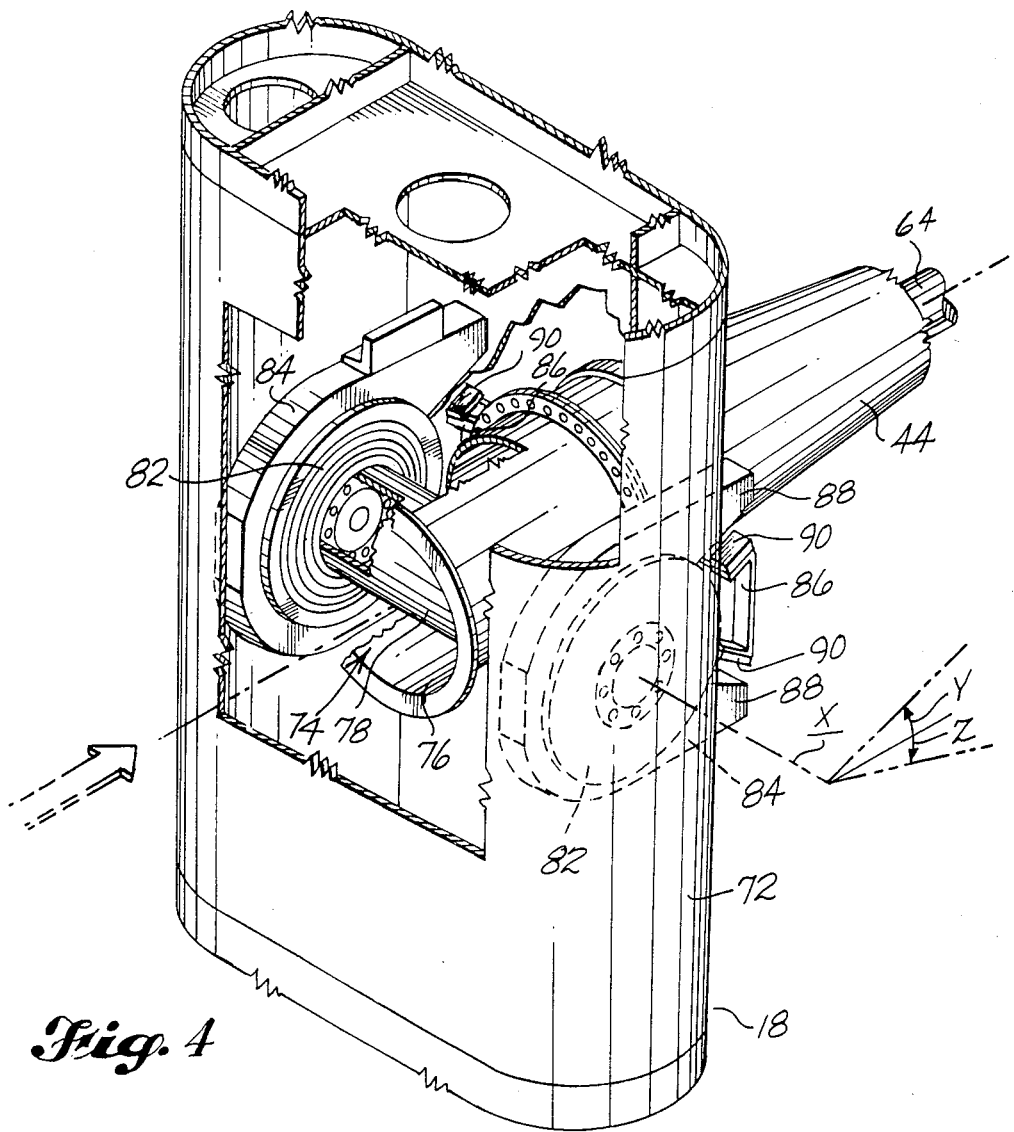
FIG. 4 is a pictorial view of a teeter connection between the hub of the turbine rotor and the outboard end of the generator drive shaft, with foreground portions of the rotor hub and the teeter mechanism being cut away, and with opposite limits of teeter movement being indicated.
Figure 7:
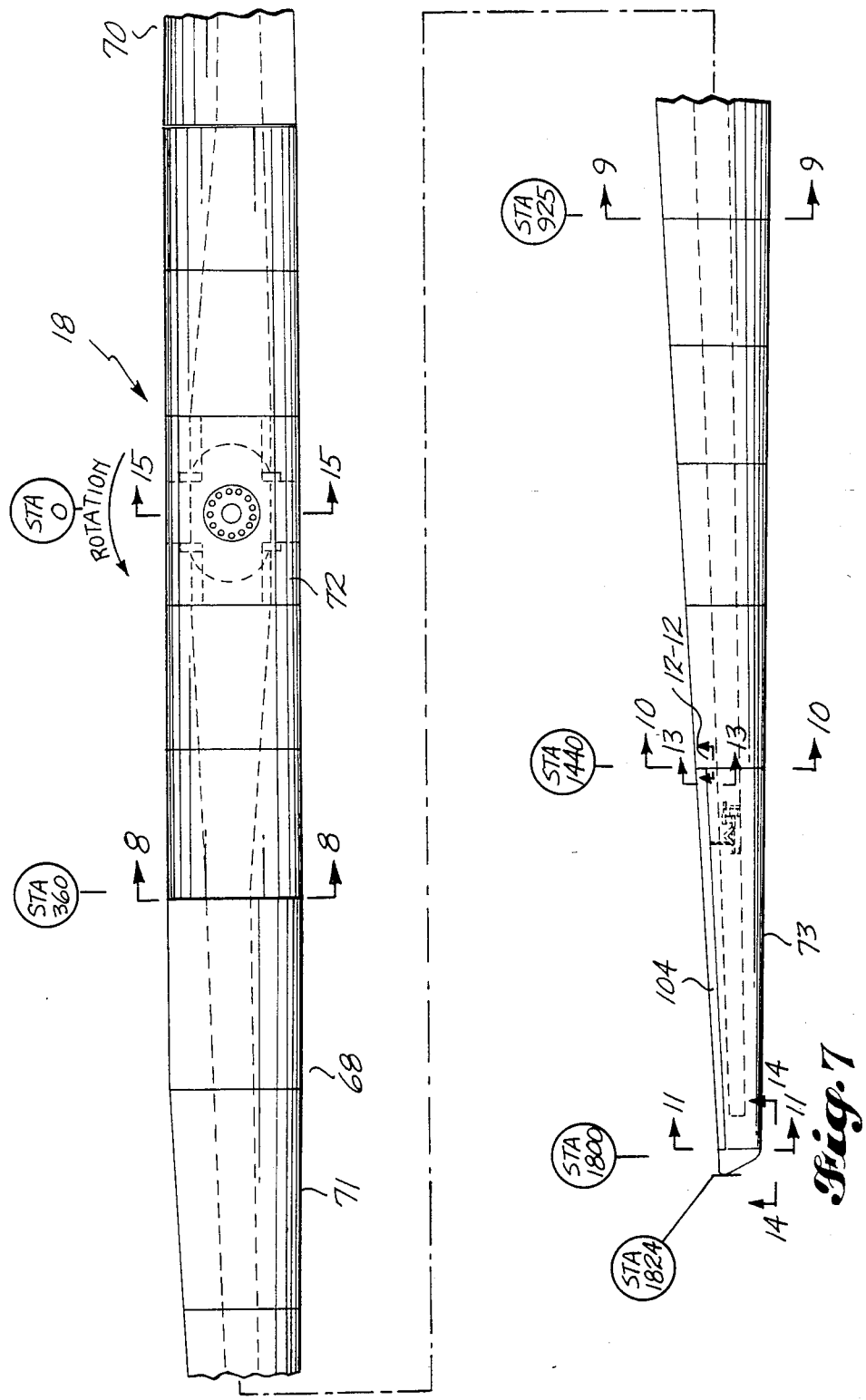
FIG. 7 is a front elevational view of one blade of the turbine rotor, the hub and a portion of the second blade, shown in two parts.

The turbine rotor 18 comprises two fixed pitch blades 68, 70 and an interconnecting hub 72. Each blade 68, 70 extends radially outwardly from the hub 72 in a direction diametrically opposite from the other blade. Each blade 68, 70 includes a fixed pitch mid-section of airfoil cross section and a fixed pitch tip or outer section, of airfoil cross section. Preferably, each blade has a plus twist inner portion adjacent the hub and changes to first a zero twist and then a minus twist as it extends radially outwardly from the hub 72. As best shown by FIGS. 4, 7 and 15, the central portion of the hub 72 has a uniform thickness and is defined by parallel sidewalls interconnected by rounded edges. Each blade 68, 70 smoothly changes into an airfoil cross section as it extends radially outwardly from the central portion of the hub 72.

In preferred form, the airfoil profile of each blade changes as the blade extends radially outwardly from a NACA 230XX airfoil in the inboard region to a NACA 430XX airfoil in the outboard region. In the example, each blade changes from a substantially NACA 23028 airfoil profile at plus twist, to a substantially NACA 23023 airfoil profile at zero twist, to a substantially NACA 43018 airfoil profile at zero twist, to a substantially NACA 43012 airfoil profile at minus twist.

The following table shows the blade profile changes at the radial stations which are identified in FIG. 7:

| BLADE DESIGN PARAMETERS | | | | |
|---|---|---|---|---|
| Radial Station | Twist (Degrees) | Thickness (Inches) | Chord (Inches) | Airfoil Profile |
| 360 | +12.0 | 38.45 | 126.0 | NACA 23028* |
| 925 | 0.0 | 22.84 | 99.29 | NACA 23023 |
| 1440 | — | 11.63 | 14.63 | NACA 43018 |
| 1800 | −4.0 | 4.85 | 40.39 | NACA 43012 |
| 1824 | −0.0 | 0.0 | 0.0 | —** |

*Trailing edge is truncated at this radial station.
**Tip station. Twist is a constant −4.0 from station 1824 to tip.

The distributions are linear between the tabulated values.

Preferably, each blade is manufactured in two major sections; a mid-section 71 and a tip section 73. In the example, the mid-section 71 is 90 feet long and is an all-steel welded structure. The tip section 73 is approximately 32 feet long and is constructed from laminated wood or another structural material of similar strength and weight.

The two blade sections 71, 73 are bolted together using steel studs 75 which are embedded in the wood tip section. The blade mid-section 71 is attached to the hub 72 by a field welded splice. The rotor hub 72 in the example is 60 feet long and is an all-steel welded structure.

Hub 72 is attached to the outer end of the low speed shaft 44 by means of a teeter hinge 74 (FIG. 4). Referring to FIGS. 3, 4, and 15, the outer end portion 76 of shaft 44 carries a cross tube 78 which carries a trunnion 80 at each of its ends. The trunnions 80 are received within elastomeric radial bearings 82 which are carried by the hub 72. The trunnions 80 are fixed relative to tube 78 which is a fixed portion of tube 76 and the shaft 44 of which it is a part.

The rotor 18 is free to teeter within the limits provided by stop mechanisms which consist of yolks 84 carried by the hub section and abutments 86 which are carried by the shaft 44. The yolks 84 open inwardly and each comprises a pair of spaced apart arms 88. The abutments 86 are positioned within the spaces between the arms 88. The distance between arms 88 is larger than the dimension of the abutment 86 in the same direction. As a result, the rotor 18 can teeter about the trunnion axis x until one or the other of arms 88 make contact with an associated stop pad 90 carried by the abutments 86. In the example, the rotor 18 is able to teeter about seven degrees away from a perpendicular position relative to the shaft axis, in either direction.

FIG. 7 shows that in plan form the tip section 113 has a leading edge which angles rearwardly. FIG. 14 shows that the tip section 113 decreases in thickness as it extends outwardly. Thus, in cross section, the tip section 113 maintains an aerodynamic shape, similar in configuration to the shape shown by FIG. 11, but progressively decreases in size. The leading edge progressively sweeps rearwardly and the rotor tip 113 progressively decreases in thickness from station 1800 outwardly to station 1824. A relatively flat back surface is maintained, so the decrease in thickness occurs by a reshaping of the front surface of the tip section 113. The front surface slopes downwardly as it extends outwardly, to provide the tip section taper.

As shown by FIGS. 7, 13, 18 and 20, the triangular trailing edge of each outer or tip section of rotor 18 is hinge connected to the rest of the section and is deployable as an aerodynamic drag brake for fail-safe overspeed control. The trailing edge or brake section is pivotally connected at a central side location, so that when it is pivoted about 90 degrees from its normal position it will present a substantial surface which extends generally perpendicular to the general plane of the airfoil section.

The drag brakes are automatically actuated by spring loaded mechanical trigger systems when the speed of rotation of the rotor 18 exceeds a predetermined value. The brake sections return to their normal positions whenever the rotor speed drops below such predetermined value. The trigger system will now be described in some detail.

Referring first to FIG. 16, the mechanism comprises a guide shaft 92 which extends in the longitudinal direction of the rotor blade and is supported at its two ends by brackets 94, 96. A weight 98 is slidably mounted on rod 92. Weight 98 may include a support extension 100 at its outer end. A compression spring 102 is interposed between the outer end of extension 100 and a wall of bracket 94. Spring 102 normally biases the weight 98 radially inwardly into the position shown in FIG. 17, and the phantom lines of FIG. 16.

As shown by FIGS. 18 and 20, the brake section 104 has a generally triangular cross section. It is connected at its apex to a side location of the blade section, for pivotal movement about an axis which extends in the longitudinal direction of the rotor blade. A perpendicular control arm 106 is pivotally attached at its outer end 108 to a location on the brake section 104 that is offset from the pivot connection 107. At its inner end 110 arm 106 is pivotally attached to a right angle link 112. Link 112 is pivotally attached at its opposite end 114 to the support extension 100. When the control weight 98 is in its inner position, the connection 110 is located adjacent guide shaft 92 and the brake section 104 is in its retracted position. Movement of weight 98 radially outwardly causes a rotation of the link 112 and an outward movement of rod 106. As rod 106 moves outwardly it swings the brake section 104 from its retracted position (FIG. 18) out into a deployed position (FIG. 20).

A first lock means is provided for locking control weight 98 into its inner position. A second lock means is provided for locking weight 98 into its outer position. These lock means are triggered by centrifugal force.

Referring again to FIG. 16, bracket 96 includes a yolk like support 116 at its outer or free end. Support 116 includes a pair of spaced apart, parallel support arms 118 and 120. An alignment shaft 122 extends through aligned openings in the arms 118 and 120. Shaft 122 carries a fixed stop member 124. A compression spring 126 is located between the stop member 124 and arm 118. A trigger weight 128 is secured to the outer end of shaft 122. Spring 126, acting on stop 124, normally biases shaft 122 and weight 128 radially inwardly.

Trigger weight 128 includes a pair of laterally extending support lugs 130 and 132. Each support lug carries a trip member 134 and 136. Members 134 and 136 may be in the form of bolts having head portions and threaded shank portions. This enables them to be threaded into openings carried by the lugs 130 and 132. The threaded connection provides a way of fine adjusting the position of the heads by a simple rotation of members 134 and 136.

The headed portions of members 130, 132 are directed towards each other. First end portions of a pair of lock levers 138, 140 are positioned in the space between the heads of members 130, 132. Levers 138, 140 include opposite or second end portions which are positioned to extend into the path of weight 98. Levers 138, 140 are pivotally mounted between their ends to a support member (not shown) which is attached to a frame portion of the rotor.

We claim:

1. A fixed pitch wind turbine rotor adapted to be mounted for rotation by the wind about a generally horizontal axis, comprising:
   an elongated central hub portion with no twist having rounded edges and a substantially constant thickness between the edges;
   a pair of fixed pitch blades, each blade extending radially outwardly from said hub in a direction diametrically opposite from the other blade;
   each said blade having a mid-section of airfoil cross section positioned radially outwardly of said central hub portion, and a tip section of airfoil cross section positioned radially outwardly of the mid-section;
   each said blade smoothly changing from the substantially constant thickness and rounded edge shape of the central hub portion into an airfoil cross section as it extends radially outwardly from the central hub portion;
   each blade first changing to first a plus twist and then a zero twist and then a minus twist as it extends radially outwardly; and
   each said blade tapering in thickness and chord as it extends radially outwardly from a location in its mid-section through its tip section.

2. A wind turbine rotor according to claim 1, wherein the tip section includes a sculptured tip end portion which decreases in thickness as it extends radially outwardly, said tip portion having an aerodynamic cross-sectional shape which progressively decreases in size, and having a leading edge which progressively sweeps rearwardly, and a relatively flat back surface.

3. A wind turbine rotor according to claim 1, wherein the airfoil profile of each blade changes as the blade extends radially outwardly, from a substantially NACA 23028 airfoil profile at plus twist, to a substantially NACA 23023 airfoil profile at zero twist, to a substantially NACA 43018 airfoil profile at zero twist, to a substantially NACA 43012 airfoil profile at minus twist.

4. A wind turbine rotor according to claim 1, comprising an all-steel welded hub portion, and wherein each blade comprises an all-steel welded mid-section and a laminated wood outer end section.

5. A wind turbine rotor according to claim 4, wherein each tip section includes a fixed position blade tip.

6. A wind turbine rotor, comprising:
   a hub;
   a pair of fixed pitch blades, each blade extending radially outwardly from said hub in a direction diametrically opposite from the other blades, each blade including a fixed pitch mid-section of airfoil cross section and a fixed pitch outer end section of airfoil cross section having a front surface and a back surface;
   at least one of said fixed pitch outer end sections comprising a main portion including a leading edge for said section, and a drag brake forming, trailing edge portion having a generally triangular cross-sectional shape and an apex region; hinge means hinge-connecting said apex region to said main portion, for pivotal movement of the trailing edge portion relative to said main portion, between a retracted position in which it forms a streamline trailing edge for said outer end section and a deployed position in which it extends generally across the chord of the outer end section and functions as an aerodynamic drag brake, and
   said trailing edge portion having a first side surface which forms a part of said front surface when the trailing edge portion is retracted, and which extends generally laterally of said front surface when the trailing edge portion is deployed, and a second side surface which is concealed against the main portion when the trailing edge portion is retracted, and which extends generally laterally of the back surface when the trailing edge portion is deployed, and a base surface which is a part of the back surface when the trailing edge portion is retracted, and which extends generally laterally of the outer end section when the trailing edge portion is deployed.

7. A wind turbine rotor according to claim 6, comprising a centrifugal force positioning means normally holding the drag brake in its retracted position, but operating in response to the development of a centrifugal force of a predetermined magnitude to move said drag brake into its deployed position.

8. A wind turbine rotor according to claim 7, wherein the positioning means for the drag brake comprises weight means mounted in the wind turbine rotor for radial translation between an inner position and an outer position, and linkage means interconnected between the weight means and the drag brake, said linkage means holding the drag brake in its retracted position when the weight means is in its inner position, and said linkage means holding the drag brake in its deployed position when the weight means is in its outward position.

9. A wind turbine rotor according to claim 8, comprising a releasable lock member having a lock position in which it locks the weight means in its inner position, and a centrifugal force operated trigger means for moving said lock member into an unlocked position in response to a centrifugal force of a predetermined magnitude, with said weight means being free to move radially outwardly from its inner position to its outer position, in response to centrifugal force, when the lock member is in its unlocked position.

10. A wind turbine rotor according to claim 8, further comprising spring means for normally biasing the weight means radially inwardly, said spring means functioning to move the weight means from its outer position into its inner position when centrifugal force acting on said weight means drops below said predetermined magnitude.

11. A wind turbine rotor according to claim 10, comprising a second lock member for holding the weight means in its outer position, in opposition to the force of the spring means, and means for unlocking said second lock member when the centrifugal force on the trigger mechanism drops below a predetermined magnitude, to free the weight means for inward movement.

12. A wind turbine rotor according to any of claims 6-11, comprising a drag brake of the type described, carried by each blade.

13. A wind turbine rotor according to any of claims 6-11, wherein said rotor hub has a central portion with no twist, and as the blade extends outwardly from the central portion of the hub, each blade twists to a maximum plus twist, then to a zero twist and then to a minus twist, and wherein the outer end section of each blade has a minus twist.

14. A wind turbine rotor according to any of claims 6-11, wherein the outer end sections of the blades are constructed from a lighter material than the remainder of the rotor, and said outer end sections are both thinner and narrower than the remainder of the rotor.

15. A wind turbine rotor according to claim 6, comprising linkage means housed within the main portion of the outer end section of the rotor, said linkage means having an outer end which is connected to the trailing edge portion at a location offset from the location of hinge connection of the trailing edge portion to the main portion, said linkage means being movable outwardly during deployment of the trailing edge portion to function as a drag brake, said linkage means serving to position the trailing edge portion.

16. A wind turbine rotor according to claim 6, comprising a fixed position tip end portion radially outwardly of the trailing edge portion.

17. A wind turbine rotor according to claim 16, wherein the tip end portion decreases in thickness as it extends radially outwardly, said tip end portion having an aerodynamic cross-sectional shape which progressively decreases in size, and having a leading edge which progressively sweeps rearwardly, and a relatively flat back surface.

18. A wind turbine rotor according to claim 15, comprising a fixed position tip end portion radially outwardly of the trailing edge portion.

19. A wind turbine rotor according to claim 18, wherein the tip end portion decreases in thickness as it extends radially outwardly, said tip end portion having an aerodynamic cross-sectional shape which progressively decreases in size, and having a leading edge which progressively sweeps rearwardly, and a relatively flat back surface.

* * * * *